UNITED STATES PATENT OFFICE.

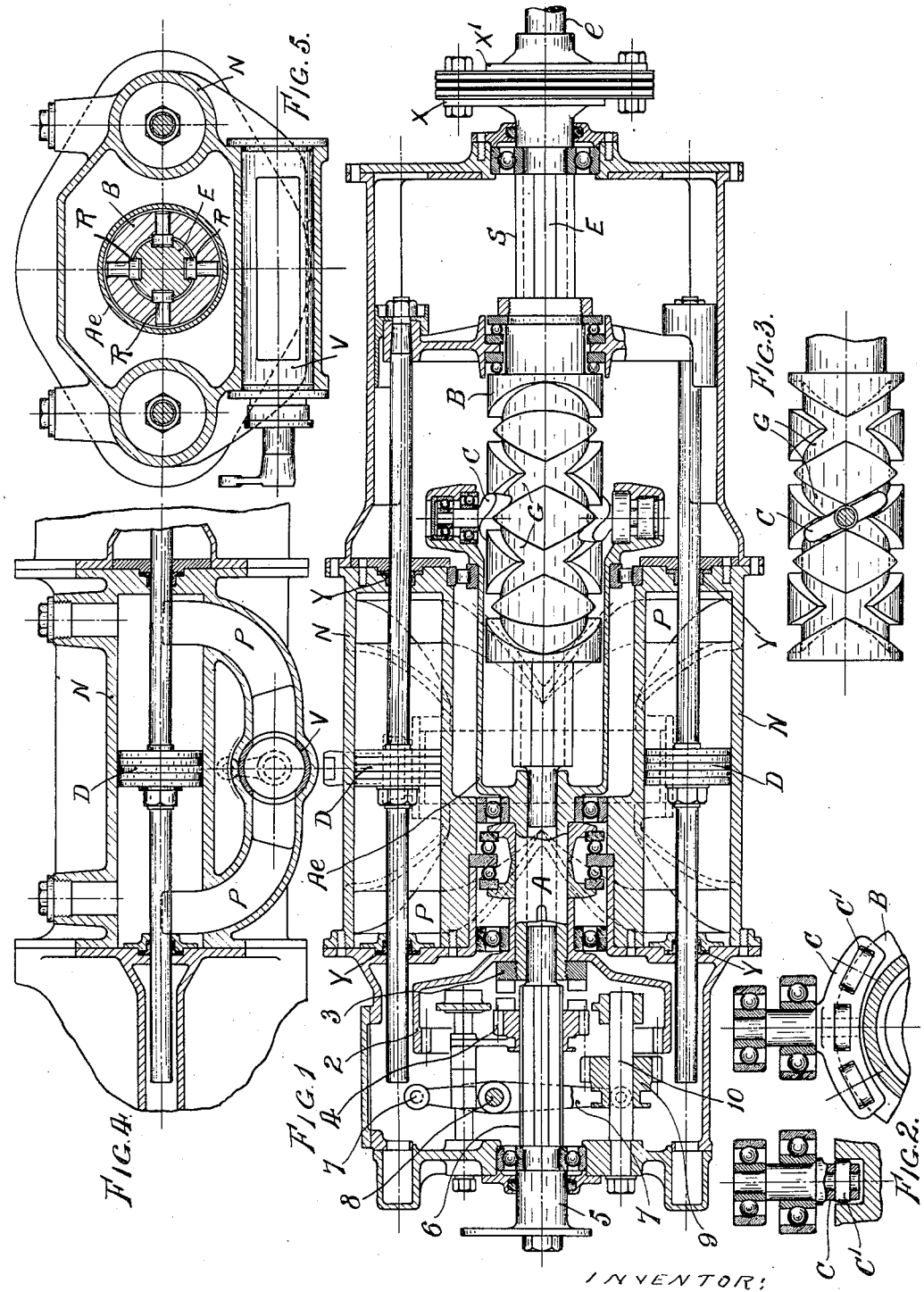

SERGE BOBROVSKY, OF LONDON, ENGLAND, ASSIGNOR OF ONE-HALF TO CROSSLEY MOTORS LIMITED, OF MANCHESTER, LANCASTER, ENGLAND.

VARIABLE-SPEED DEVICE.

1,413,095.  Specification of Letters Patent.  Patented Apr. 18, 1922.

Application filed April 25, 1919. Serial No. 292,736.

*To all whom it may concern:*

Be it known that I, SERGE BOBROVSKY, a citizen of Russia, residing at 9 Randolph Crescent, London, W. 9, England, have invented new and useful Improvements in a Variable-Speed Device, of which the following is a specification.

The improved variable speed device forming the subject of the present invention is a modification and improved and simplified specific arrangement of the variable speed device patented by me in Great Britain under No. 110903 for altering the ratio of transmission that is the number of revolutions or speed of a driven shaft, wheel or other part, and is characterized first by the absence of gears, and secondly in that it gives an absolutely infinite variation of speed for the driven part from zero to that of the engine shaft as in my original patented device. The said original patented device comprised a driving shaft, a driven shaft or part, a connecting shaft having a sliding connection with the driven shaft and rotatable therewith, means for operatively connecting the driving shaft with the driven part, said means comprising a socket member on the connecting shaft formed with a tortuous groove and pins on the driving shaft working within the groove, and controlling means comprising a fluid pressure clutch for resisting the reciprocating movement of the connecting shaft, and also indicated the provision of means for varying the pressure of the fluid to vary the resistance offered to the connecting shaft. The present improved device is characterized by the following features: First the sinuous or tortuous groove is an external instead of an internal groove; secondly, the clutch is placed outside the sinuous groove in the connecting shaft and is preferably duplicated; thirdly, a single throttle valve control is provided to regulate the fluid pressure of the duplicated clutch; fourthly, antifriction slippers are provided instead of pins to slide in the sinuous groove; fifthly, the connection of the connecting shaft with the final motion shaft instead of being concentrated at its extremity by means of keys is now effected by rollers fixed along the connecting shaft; and sixthly a reversing gear is combined with the variable forward speed transmission.

I illustrate my present improved device in the accompanying sheet of drawings, in which—

Fig. 1 is a sectional plan of the whole device, Fig. 2 is two detail views of the antifriction slippers, Fig. 3 is a detail of the double threaded sinuous groove in the connecting shaft showing one of the antifriction slippers, and Figs. 4 and 5 are a sectional elevation and cross section respectively of the throttle control valve and one of the cylinders containing the fluid for the duplicate clutch.

Referring to the drawings the device consists of a driving shaft A (Fig 1) having a tubular extension $A^e$. B is a connecting member which is coupled with the driving shaft A by means of the antifriction slippers C attached to the latter and operating in the double spiral grooves G cut in the former. The member B is connected to the final motion, or Cardan shaft E, and so to the extension or propeller shaft $e$. The member B is provided with internal rollers R, (Fig. 5), which operate in guideways S on the final motion, or Cardan, or propeller, shaft E which is in this case shown coupled by a form of universal joint X, X', to the extension $e$. If it be not an automobile transmission, shaft E represents the shaft transmitting the ultimate movement required. The fluid clutch arrangement, comprising the cylinders or casings N each containing a piston D, whether as shown, or otherwise connected to the member B, is an essential part thereof. The casings N are provided with passages or ducts P through which the oil or other medium under pressure can flow from one side of the pistons D to the other, a rotary throttle valve V being placed in each duct to control the flow of oil or other medium. Stuffing or packing glands Y are provided in the ends of the casings for the reception of the reduced extension of the pistons D so as to prevent leakage of the fluid.

The antifriction slippers C need not necessarily be constructed as shown in Fig. 2 as they may be constructed in a variety of ways. In order to reduce the frictional resistance to sliding in the grooves to a minimum, they may be provided with balls or rollers, e. g. as shown in Fig. 2 which shows the preferred construction of slipper C fitted with rollers C'.

The other extremity of the driving shaft A is bored out hollow to form the socket $A^e$ which is connected to the connecting member by the slippers C and grooves G while the connecting member B is itself connected to the final motion shaft E through the rollers R and longitudinal keyways S.

The position of the connecting member B in relation to the pistons D is fixed to prevent relative longitudinal movement, but not so as to prevent free rotation of the connecting member B. The clutch pistons D are so fitted in their containing casings N that the piston extensions or rods passing through the stuffing or packing glands Y, can easily reciprocate whilst the casing itself remains stationary, being secured to the frame carrying the whole mechanism.

Upon longitudinal displacement of the connecting member B the pistons D being attached to it move longitudinally either towards the left or right side of the casings N, thus tending to displace the oil or other medium contained therein towards that same side, and out by the passage or duct P to the other side of the piston.

In this passage is placed the rotary throttle valve V which can wholly or partially prevent the flow of oil through the passage and therefore can wholly or partially prevent the displacement of oil by the pistons D, thus allowing the pistons to either:—(1) move freely, (2) to be hindered or retarded or (3) completely held from moving longitudinally according as to whether the rotary valve is fully open, partially open, or completely closed.

Upon rotation of the extension shaft $A^e$ holding the antifriction slippers C sliding in the spiral grooves G of the connecting member B, the latter either,—(1) rotates only, (2) reciprocates only or (3) rotates and moves longitudinally simultaneously, owing to the direction of the spiral being at an angle with the axis of the member B. If the grooves G are smooth, then (providing the more easy displacement of member B be along its axis), if the rotation of member B be hindered or retarded due to the resistance to rotation of the driven final motion shaft E, it will reciprocate, and with it the pistons D, and owing to the final motion shaft E being held from endwise movement there will be sliding between the keys or splines S of the latter and their corresponding rollers R on the connecting member B. If, however, the longitudinal displacement of the connecting member B be hindered through the resistance of the oil to the pistons D, the slippers C will force the member B to turn simultaneously with its longitudinal displacement and consequently the more the longitudinal displacement of the connecting member B is hindered, the more the rotary movement of the driving shaft A is conveyed to it, and therefore to the driven final motion shaft E.

If the displacement of the pistons D meets with such resistance from the oil or other medium, owing to the closing of the rotary throttle valve V, that the connecting member B cannot move axially, the revolutions of the driving shaft A will be conveyed entirely to the connecting member B through the pressure of the slippers C in the spiral grooves G and therefore to the final motion shaft E directly connected with them. This will be the direct drive.

On the other hand, if displacement of the pistons D meets with no resistance from the oil owing to the rotary valve V being fully open, then providing the shaft E offers a certain resistance to rotation, the member B offering the same resistance to rotation will only reciprocate; this will disconnect the driving shaft A from the final motion shaft E and will correspond in an automobile to the engine running light and the vehicle remaining stationary. The gradual increase of clutch action on longitudinal displacement of the pistons D and therefore of the connecting member B effected by a gradual closing of the rotary valve V will gradually convey rotation as desired to the final motion shaft E, the speed of which will, more and more, correspond with that of driving shaft A. Therefore the difference between the number of revolutions of the driving shaft A and final motion shaft E may be altered quite gradually, depending on the resistance applied to the clutch pistons D by opening or closing the rotary valve V, according to the resistance to rotation of the final motion shaft E (i. e. the resistance to motion of the vehicle or load). Thus any speed ratio of a driving shaft to a driven shaft may be obtained.

A simple form of reverse is shown in Fig. 1 and comprises an internally toothed wheel 2 fixed upon the driving shaft A on which is also fixed one member 3 of a toothed clutch the other member 4 of which is mounted to slide upon the first motion or engine shaft 5. The clutch member 4 is fitted to slide on splines or keys 6 on the first motion shaft 5 and is operated by means of a lever 7 to set the clutch member 4 into or out of gear with the member 3 fixed on the driving shaft A. The lever 7 is fulcrumed at 8 and at its lower end is forked and embraces the boss of a gear 9 fitted to slide on a shaft 10 into and out of gear with the internally toothed wheel 2.

It will thus be seen that when the lever 7 is actuated to withdraw the clutch member 4 from the other clutch member 3 and its further movement in the same direction from the neutral position shown in Fig. 1 will first of all place the sliding gear 9 into mesh with the internal teeth of the gear 2 and subsequently bring the gear teeth on the sliding clutch member 4 into mesh with teeth of the sliding gear 9 thereby driving the internally toothed gear wheel 2 in the reverse direction to that of the first motion or engine shaft 5.

What I claim and desire to secure by Letters Patent of the United States is:—

1. A variable speed device, comprising, in combination, a driving shaft having a tubular extension, a driven shaft, a connecting member rotatable with said driven shaft and reciprocable in said extension, cooperating means carried by said driving shaft and connecting member for reciprocating said member, a non-rotatable fluid-containing cylinder at each side of said member, a by-pass for each cylinder communicating with the cylinder adjacent its opposite ends, a piston in each of said cylinders and connected with said member for reciprocation therewith, and a valve in each of said by-passes for controlling the passage of fluid from one side of the piston to the other.

2. A variable speed device, comprising, in combination, a driving shaft having a tubular extension, a driven shaft, a connecting member rotatable with said driven shaft and reciprocable in said extension and provided in its periphery with a pair of sinuous grooves, a plurality of members carried by said tubular extension and cooperating with said grooves to cause rotative and reciprocatory movements of said connecting member, non-rotatable means connected with said member for reciprocating therewith, and means for preventing reciprocation of said non-rotatable means thereby to hold the connecting member against reciprocation and cause rotation of the driven shaft.

3. A variable speed device, comprising in combination, a driving shaft having a tubular extension, a driven shaft provided with a plurality of peripheral grooves extending longitudinally thereof, a connecting member having a portion thereof reciprocable in said extension and a tubular portion provided with a plurality of rollers at its interior for engagement with the grooves of the driven shaft, a non-rotatable fluid-containing cylinder at each side of said connecting member, a by-pass for each cylinder communicating with the cylinder adjacent its opposite ends, a piston in each of said cylinders and connected with said member for reciprocation therewith, and a valve in each of said by-passes for controlling the passage of fluid from one side of the piston to the other.

In testimony whereof I have signed my name to this specification.

SERGE BOBROVSKY.